United States Patent [19]

Holmes et al.

[11] Patent Number: 5,073,767

[45] Date of Patent: Dec. 17, 1991

[54] SELECTIVE CALL RECEIVER THEFT PROTECTION DEVICE

[75] Inventors: Thomas F. Holmes; Rick Johnson; Brian P. Lenhart, Jr., all of Boynton Beach, Fla.

[73] Assignee: Motorola, Inc., Schaumburg, Ill.

[21] Appl. No.: 446,368

[22] Filed: Dec. 5, 1989

[51] Int. Cl.[5] .......................... H04Q 1/30; G08B 5/22

[52] U.S. Cl. .................................. 340/311.1; 340/543; 340/825.44; 235/382.5

[58] Field of Search ...................... 340/311.1, 542, 543, 340/568, 571, 572, 825.22, 825.32, 825.5, 825.44, 825.31; 307/9.1, 10.3, 10.4, 10.5; 235/382.5

[56] References Cited

U.S. PATENT DOCUMENTS

| | | | |
|---|---|---|---|
| 4,246,573 | 1/1981 | Kiss | 340/426 |
| 4,378,551 | 3/1983 | Drapac | 340/311.1 |
| 4,518,961 | 5/1985 | Davis et al. | 179/2 EC |
| 4,649,538 | 3/1987 | DeLuca et al. | 371/25 |
| 4,683,462 | 7/1987 | Takeda et al. | 340/825.32 |
| 4,755,816 | 7/1988 | DeLuca | 340/825.44 |
| 4,808,981 | 2/1989 | Seibold | 340/825.32 |
| 4,843,385 | 6/1989 | Borras | 340/825.32 |

*Primary Examiner*—Donnie L. Crosland
*Attorney, Agent, or Firm*—Daniel R. Collopy; Vincent B. Ingrassia; William E. Koch

[57] ABSTRACT

A selective call receiver allows reprogramming of the options stored within a code plug only after entry of a correct password. After a predetermined number of unsuccessful attempts to enter a correct password, the selective call receiver is user disabled such that the user may not reenable the selective call receiver without returning the receiver to the manufacturer or without replacing expensive components thereof.

29 Claims, 3 Drawing Sheets

SELECTIVE CALL RECEIVER THEFT PROTECTION DEVICE

FIELD OF THE INVENTION

This invention relates in general to electronic devices with reprogrammable memories, and in particular to selective call receivers with reprogrammable code plugs.

BACKGROUND OF THE INVENTION

The theft of electronic devices is on the rise because of the convenient size of the devices and the high monetary return a thief can receive for stolen devices. One such electronic device is a selective call receiver. Many electronic devices have a variety of options, some or all of which can be activated upon purchase. For individualization of a device, it is desirable that a user be able to alter some or all of the device's optional features. These options are typically stored in an electrical erasable, programmable read only memory (EEPROM), but can be stored in other programmable nonvolatile memory devices. Allowing the user the ability of reprogramming some or all of the options, however, also allows a thief to reprogram these options unless the electronic device is protected against unauthorized reprogramming.

Each selective call receiver has a unique selective call address that allows for the receiver to receive selective call messages so addressed. The selective call address is typically stored in an EEPROM called a code plug. Other selective call receiver options are customarily established by other information stored in the code plug. Regrettably, allowing code plug reprogrammability to the user also allows for possible reprogramming of the EEPROM unauthorized by the user.

Generally, stolen selective call receivers are useless unless the selective call address can be changed. If the selective call address remains unchanged, the new user of the selective call receiver could only receive messages intended for the previous owner. In various selective call receivers manufactured today, the frequency that the receiver operates on can be altered by reprogramming the code plug. Altering the frequency would allow the selective call receiver to operate within another selective call system making the purchase of the stolen selective call receiver more desirable. Also, the purchase of a stolen electronic device would be less desirable if the user could not take advantage of all of the options for which the device was designed.

Thus, what is needed is a method and apparatus for protected reprogrammability of an electronic device.

SUMMARY OF THE INVENTION

In carrying out the above and other objects of the invention in one form, there is provided an apparatus to allow authorized reprogramming of at least a portion of the options stored in an electronic device, such as a selective call receiver, and to user disable the electronic device if a predetermined password is not correctly entered within a predetermined number of attempts.

DETAILED DESCRIPTION OF THE INVENTION

Figure 1:
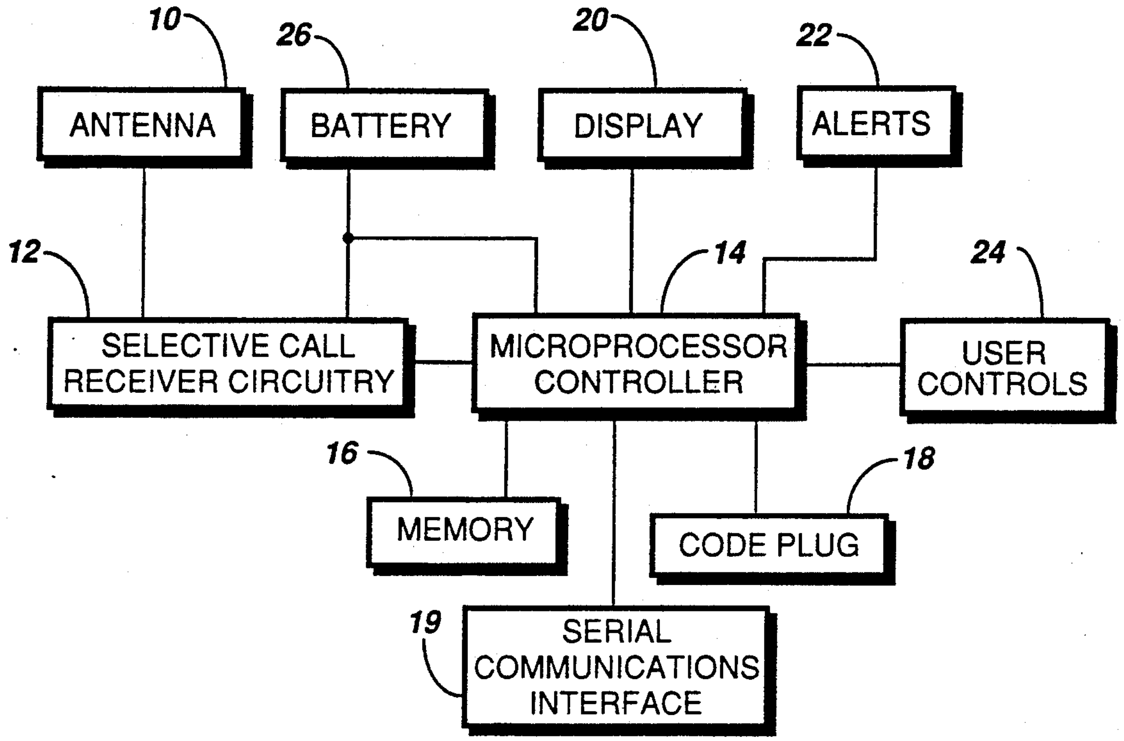
FIG. 1 is a block diagram of a selective call receiver according to the present invention.

Referring to FIG. 1, a selective call receiver comprises an antenna 10 for receiving signals coupled to a selective call receiver circuit 12 that demodulates the signals received. A microprocessor controller 14 is coupled to the receiver circuit 12 for processing the received signals. A memory 16 is coupled to the microprocessor controller 14 for storing those messages containing the address of the selective call receiver as determined by the microprocessor controller 14. A code plug 18 is preferably an electrical erasable, programmable read only memory (EEPROM) coupled to the microprocessor 14 for providing option information, such as the address and frequency of the selective call receiver, to the microprocessor 14. Also stored in the code plug 18 are configurations of various optional features which enhance the operation and/or performance of the selective call receiver, such as the length and types of various alerts and alarms, the type of code used by the selective call receiver (e.g., alphanumeric, numeric or voice) and various reminder chirps such as an unread message reminder chirp every half hour.

A serial communications interface 19 comprises a serial input/output data port that allows digital communication between a device outside the selective call receiver and the microprocessor 14. A display device 20 visually presents information and is controlled by the microprocessor controller 14. Alerts 22 provide alarms, such as audible and visual alerts, to inform the selective call receiver user of various events and is also controlled by the microprocessor controller 14. User controls 24 allow the user to command the microprocessor controller 14 to perform the selective call receiver operations such as selecting and reading messages and other selective call operations well known to those skilled in the art. The user controls 24 typically include control switches such as an ON/OFF control button, directional controls, and a message read control. A battery 26 is coupled to the receiver circuit 12, the microprocessor 14, the display 20 and the alerts 22 to provide power for the operation of the selective call receiver. For a more detailed description of the structure and operation of a selective call radio paging receiver of the type shown in FIG. 1, reference is made to U.S. Pat. No. 4,518,961, U.S. Pat. No. 4,649,538, and U.S. Pat. No. 4,755,816, all commonly assigned to the same assignee as the present invention, and the teachings of which are hereby incorporated by reference.

Figure 2:
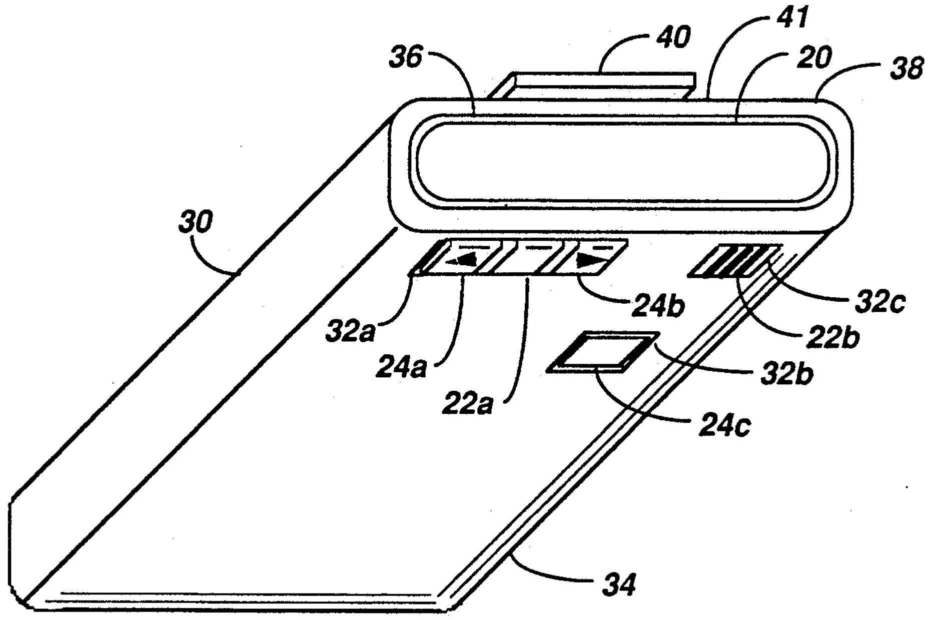
FIG. 2 is a top front left perspective of a selective call receiver according to the present invention.

Referring next to FIG. 2, the selective call receiver comprises a housing 30 including openings **32*a* and 32*b* in a front plate 34 with user selectable control buttons 24*a* and 24*b*, and 24*c*, respectively, accessible therethrough. A visual alert 22*a* is also viewable through opening 32*a*. An audible alert 22*b* is mounted behind slotted opening 32*c*. The display device 22 is a liquid crystal display (LCD) viewable through another opening 36 in a top plate 38. The display 20 of the preferred embodiment is capable of displaying alphanumeric information. Each activation of the user selectable control buttons 24***a* and 24*b* select one of the messages stored in memory 16 (FIG. 1). By activating the user selectable control button 24*c*, the user can display the selected stored message on the display device 20. A clip 40 is mounted on a back plate 41 of housing 30 to allow the user to mount the selective call receiver on the user's clothing, such as a belt or a pocket.

Figure 3:
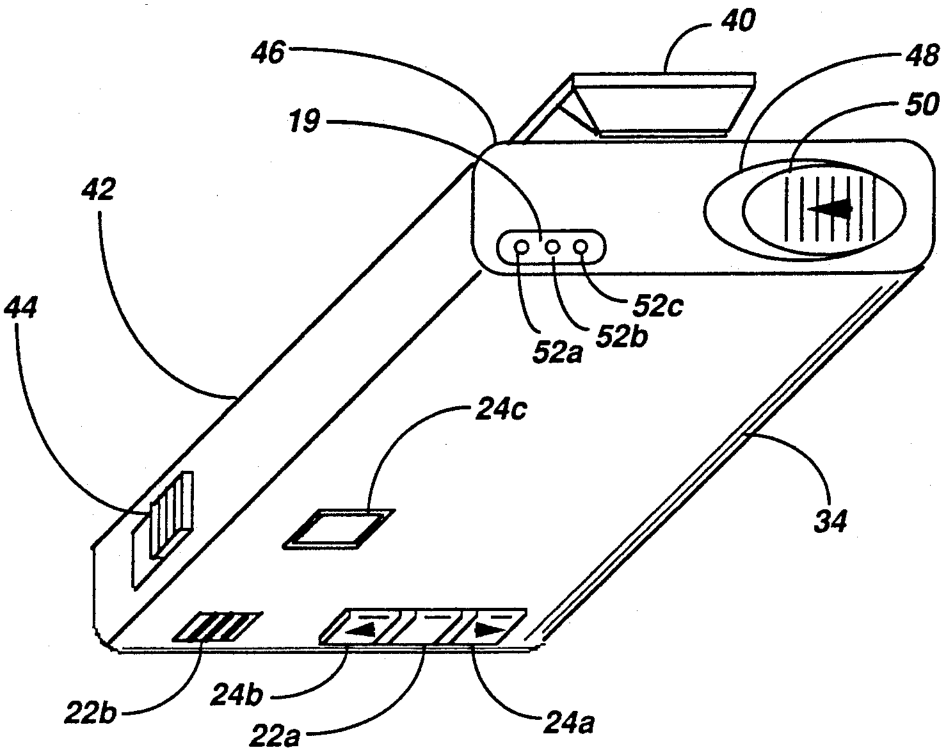
FIG. 3 is a bottom front right perspective of a selective call receiver according to the present invention.

Referring to FIG. 3, a right plate 42 of the selective call receiver has an ON/OFF power switch 44 mounted thereon. Other user selectable controls could be added to the selective call receiver but are not essential to the operation of the present invention. A bottom plate 46 of the selective call receiver has an opening 48 for inserting the battery 26 (FIG. 1). A battery cover 50 restrains the battery 26 within the selective call receiver. The serial communications interface 19 has three receptacles 52*a*, 52*b*, and 52*c* for receiving three conductive plugs thereby forming a digital data input/output port.

Figure 4:
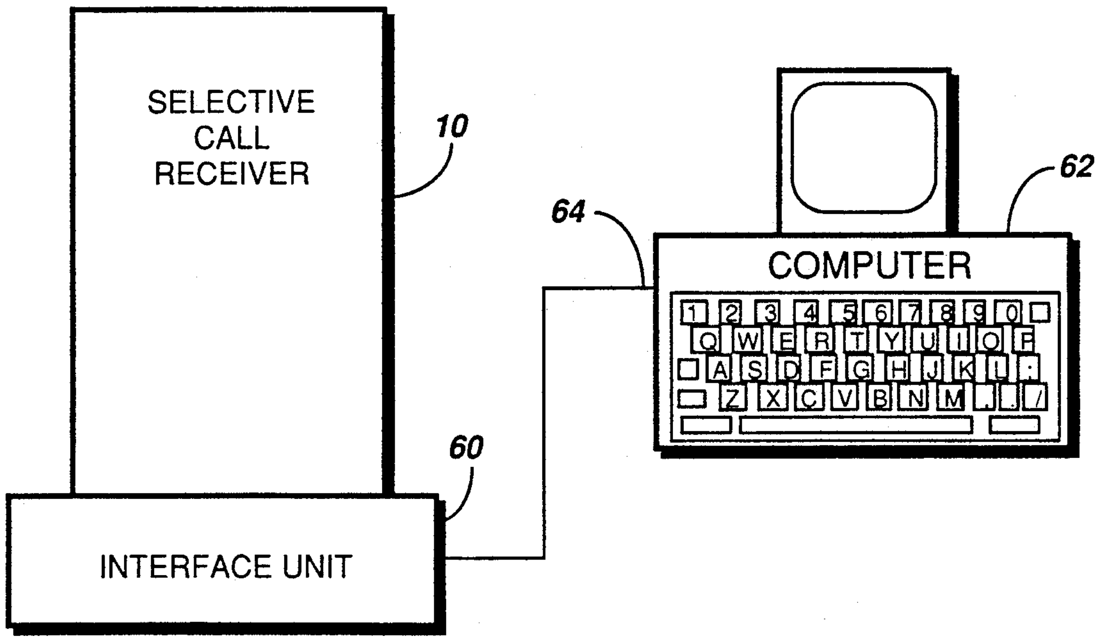
FIG. 4 is a depiction of the preferred embodiment of the present invention.

Referring next to FIG. 4, an interface unit 60 contains the three conductive plugs to allow the selective call receiver 10 to be physically and electrically coupled thereto. In the preferred embodiment, the interface unit 60 allows reprogramming of the code plug 18 (FIG. 1) via a program in the microprocessor 14 of the selective call receiver. Reprogramming of the code plug 18 is handled by a computer 62 via a computer data port 64, such as an RS232 data port. The computer 62 could be a personal computer and the interface unit 60 could additionally serve as a battery charger for charging the battery 26 (FIG. 1).

Figure 5:
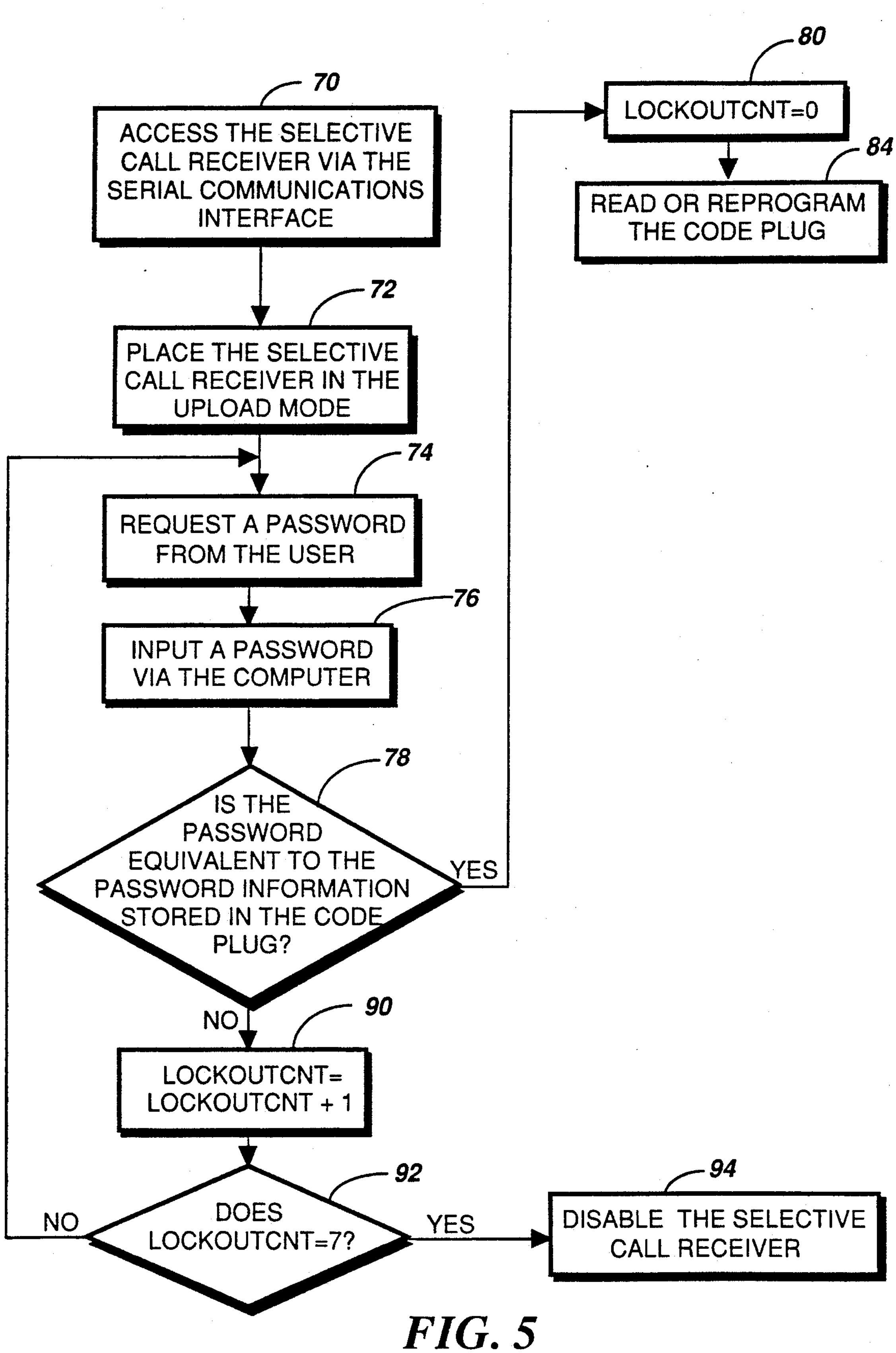
FIG. 5 is a flowchart of the protected reprogramming operation of the preferred embodiment of the present invention.

Referring to FIG. 5, the processing of the reprogramming routine of the computer 62 (FIG. 4) starts at step 70, where the selective call receiver is accessed by the computer 62 via the interface unit 60 and the serial communications interface 19 (FIG. 3). The computer 62 places the selective call receiver in a upload mode 72, whereby the computer 62 uploads the information stored in the code plug 18. A password is requested from the user 74. The password is received 76 from a keyboard of the computer 62. If the password data received is equivalent to the password information stored in the code plug 78, a lockout counter LOCKOUTCNT is initialized to zero 80. The code plug can then be read or reprogrammed 84. The password information in the code plug can be encrypted to prevent anyone tampering with the serial communications interface 19 from reading the password information.

If the received password data is not equivalent to the password information stored in the code plug 78, LOCKOUTCNT is incremented by one 90. If LOCKOUTCNT does not equal seven 92, the reprogramming routine requests another password from the user 74. If LOCKOUTCNT equals seven 92, the selective call receiver is user disabled 94 and no further attempts to enter a correct password by the user will be allowed. The selective call receiver can be user disabled in a variety of ways. In the preferred embodiment, the display 20 (FIG. 2) displays an alphanumeric message stored in nonvolatile memory every time that the display 20 is activated. The alphanumeric message is "PAGER DISABLED". In addition, when the receiver is user disabled an audible alert 22*b* and/or a visual alert 22*a* could be activated either continuously or intermittently which has the added advantages of being annoying to the user who attempted unauthorized reprogramming and quickly discharging the battery 26 causing the receiver to have no operating power.

An alternate embodiment would allow for the receiver to be functionally disabled upon the entry of a first incorrect password but would allow subsequent entries of passwords up to the predetermined number of attempts. After a predetermined number of failed attempts to enter the correct password, no further attempts to enter a correct password would be allowed. A subsequently entered correct password would functionally reenable the selective call receiver.

Once user disabled, the receiver can only be reenabled by returning the selective call receiver to a manufacturer designated repair facility or by replacing the parts so disabled. In the preferred embodiment, purchase of the user disabled parts for replacement amounts to a price substantially equivalent to the purchase of a new selective call receiver, thereby making theft of the protected selective call receivers economically disadvantageous.

We claim:

1. An electronic device comprising:

programmable memory means for storing password information and a predetermined encryption algorithm;

interface means for transmitting information to and receiving data from an external programming device;

data conversion means for translating said data received according to said predetermined encryption algorithm to obtain password data and reprogramming data;

reprogramming means for reprogramming said programmable memory means with said reprogramming data if said password data is substantially equivalent to said password information; and disabling means for user disabling said electronic device if said password data is not substantially equivalent to said password information on each of a predetermined number of inputs.

2. The electronic device of claim 1 further comprising counter means for initializing a lockout counter if said password data is substantially equivalent to said password information and for counting each input of said password data where said password data is not substantially equivalent to said password information, wherein said disabling means user disables said electronic device in response to said lockout counter counting to said predetermined number.

3. The electronic device of claim 1 wherein said electronic device comprises at least one output device and wherein said disabling means user disables said at least one output device if said password data is not substantially equivalent to said password information on each of said predetermined number of inputs.

4. The electronic device of claim 1 further comprising lockout means for user disabling said input means if said password data is not substantially equivalent to said password information on each of said predetermined number of inputs.

5. A selective call receiver comprising:

a reprogrammable memory;

an input/output interface for allowing communication between said reprogrammable memory and an external programming device; and device disabling means for user disabling said selective call receiver in response to a predetermined number of unauthorized attempts by said external programming device to reprogram at least a portion of said reprogrammable memory.

6. The selective call receiver of claim 5 further comprising output means for presenting information to a user, and wherein said device disabling means comprises:

a lockout counter for counting each of said unauthorized attempts to reprogram said reprogrammable memory; and output disabling means for user disabling said output means in response to said lockout counter counting to said predetermined number.

7. The selective call receiver of claim 5 wherein said device disabling means further comprises:

lockout means for preventing any further attempts to reprogram said reprogrammable memory in response to said predetermined number of unauthorized attempts to reprogram at least said portion of said reprogrammable memory.

8. The selective call receiver of claim 6 further comprising:

authorization means for generating a first signal if password data received from said external programming device via said input/output interface is substantially equivalent to password information stored within said reprogrammable memory and for generating a second signal if said password data is not substantially equivalent to said password information;

reprogramming means for reprogramming in response to said first signal at least a portion of said reprogrammable memory with reprogramming data received from said external programming device via said input/output interface; and counter adjusting means for initializing said lockout counter for each occurrence of said first signal and for incrementing said lockout counter for each occurrence of said second signal.

9. The selective call receiver of claim 6 wherein said output means comprises a display device.

10. The selective call receiver of claim 6 wherein said output means comprises an audio alert device.

11. The selective call receiver of claim 6 further comprising interface disabling means for user disabling said input/output interface in response to said lockout counter counting to said predetermined number.

12. The selective call receiver of claim 9 wherein said display device comprises an alphanumeric display device.

13. The selective call receiver of claim 9 wherein said output means further comprises an audio alert device.

14. The selective call receiver of claim 10 wherein said output disabling means comprises alert means for activating said audio alert device in a predetermined manner.

15. The selective call receiver of claim 12 wherein said output disabling means comprises stored message display means for providing stored message information to said display device for presentation thereon.

16. The selective call receiver of claim 13 wherein said output disabling means comprises continuous alert means for continuously activating said audio alert device in response to said lockout counter counting to said predetermined number.

17. The selective call receiver of claim 13 wherein said output disabling means comprises intermittent alert means for intermittently activating said audio alert device in response to said lockout counter counting to said predetermined number.

18. The selective call receiver of claim 14 wherein said alert means intermittently activates said audio alert device.

19. The selective call receiver of claim 14 wherein said alert means continuously activates said audio alert device.

20. The selective call receiver of claim 15 wherein said stored message display means provides said stored message information to said display device for continuously presenting thereon.

21. The selective call receiver of claim 15 wherein said stored message display means provides said stored message information to said display device for intermittently presenting thereon.

22. The selective call receiver of claim 15 wherein said stored message display means provides said stored message information to said display device for presentation thereon upon each activation of said display device.

23. The selective call receiver of claim 8 further comprising data conversion means for de-encrypting a password received from said external programming device according to a predetermined algorithm stored within said reprogrammable memory to obtain said password data for providing to said authorization means.

24. The selective call receiver of claim 23 wherein said data conversion means de-encrypts data received from said external programming device according to said predetermined algorithm to obtain said reprogramming data for providing to said reprogramming means.

25. In an electronic device having a reprogrammable memory, an input/output port for communication with an external device, and at least one output device, said at least one output device capable of being user disabled such that a user of the electronic device may not reenable the at least one output device, a method for reprogramming the reprogrammable memory comprising the steps of:

(a) establishing communications via the input/output port with an external programming device;

(b) receiving a password from the external programming device;

(c) determining whether said password received from the external programming device is equivalent to a predetermined password stored in said reprogrammable memory;

(d) repeating steps (b) and (c) if said password received is not equivalent to the predetermined password and if a predetermined number of said passwords have not been received, said predetermined number greater than one;

(e) user disabling said at least one output device after said predetermined number of said passwords so received are determined to be not equivalent to the predetermined password;

(f) receiving reprogramming information from said external programming device if said password is equivalent to the predetermined password; and (g) reprogramming said reprogrammable memory in response to said reprogramming information.

26. The method according to claim 25 wherein said at least one output device comprises a display and a control means for activating said display, and said step (e) of user disabling said at least one output device of said electronic device includes the step of displaying a predetermined message in response to all subsequent activations of said display by said control means.

27. The method according to claim 25 wherein said at least one output device comprises an audible alert, and said step (e) of user disabling said at least one output device includes the step of activating said audible alert in a predetermined manner in response to said predetermined number of said passwords so received not equivalent to said predetermined password.

28. The method according to claim 25 further comprising the step of (h) preventing further reception of said reprogramming information after said predetermined number of said passwords are received without receiving said predetermined password.

29. The method according to claim 25 wherein said step (b) of receiving said password comprises the steps of:

(i) receiving an encrypted password from said external programming device; and (j) converting said encrypted password to said password according to a predetermined de-encrypting algorithm stored in said reprogrammable memory.

* * * * *